United States Patent [19]
Durno et al.

[11] 3,908,399
[45] Sept. 30, 1975

[54] PRIMARY FLIGHT CONTROL WITH ISOLATED GEAR BOX

[75] Inventors: Ronald Arthur Durno, Trumbull; James Clement Dean, Stratford, both of Conn.

[73] Assignee: United Technologies Corporation, Hartford, Conn.

[22] Filed: Apr. 23, 1973

[21] Appl. No.: 353,924

[52] U.S. Cl. ............ 64/17 R; 64/1 V; 64/1 C; 64/23; 244/17.25; 244/102 R; 416/113
[51] Int. Cl. ............................................ F16d 3/26
[58] Field of Search ............ 64/1 C, 1 V, 12, 19, 23, 64/17 SP, 6, 17 R, 1 R; 244/102, 17.25, 17.27; 416/113, 114

[56] References Cited
UNITED STATES PATENTS

| | | | |
|---|---|---|---|
| 2,050,497 | 8/1936 | McCollum | 64/23 |
| 2,677,431 | 5/1954 | Prince | 244/17.27 |
| 2,719,016 | 9/1955 | Wicks | 244/102 R |
| 2,724,446 | 11/1955 | Hill | 244/17.25 |
| 3,100,610 | 6/1963 | Armstrong | 244/17.25 |
| 3,118,504 | 1/1964 | Cresap | 244/17.25 |
| 3,293,884 | 12/1966 | Grob | 64/23 |
| 3,411,324 | 11/1968 | Federline | 64/19 |
| 3,427,824 | 2/1969 | Mayrath | 64/2 R |
| 3,483,683 | 12/1969 | McCanse | 64/23 |
| 3,554,662 | 1/1971 | Lemont | 416/113 |
| 3,662,567 | 5/1972 | Condon | 64/6 |

*Primary Examiner*—Samuel Scott
*Assistant Examiner*—Randall Heald
*Attorney, Agent, or Firm*—Maurice B. Tasker

[57] ABSTRACT

A helicopter has its main rotor gear box isolated by flexible mounts from the fuselage frame. A rigid, load-carrying flight control system, originating in the pilot's compartment, extends to the mixer unit and thence to the main rotor servos which are carried by the gear box. The flight control system includes a torsional drive coupling mechanism comprising a torque shaft installed between the rotor pitch control servos and the mixer unit, the torque shaft being connected to the mixer unit by linkage including a universal joint carried by the airframe and to the servo units by a combination universal-and-axial-slip-joint, whereby linear displacements of the gear box in any plane are not transmitted back to the mixer unit and the rotary input to the servo units is not interferred with as a result of such displacements. In another embodiment of the invention a modified universal joint eliminates the slip-joint feature.

The invention herein described was made in the course of or under a contract or subcontract thereunder with the Department of the Army.

2 Claims, 5 Drawing Figures

PRIMARY FLIGHT CONTROL WITH ISOLATED GEAR BOX

BACKGROUND OF THE INVENTION

1. Field of the Invention

This invention relates to helicopters in which a main rotor is carried by and is driven from a transmission, or gear box, usually rigidly supported on the fuselage structure and the flight mechanism of the rotor head is pilot controlled by means of a rigid, load-carrying control system in which the input portion of the system is rigidly mounted on the airframe and the output portion is mounted on the gear box.

2. Description of the Prior Art

Sikorsky helicopters have heretofore employed rotor head control systems and gear boxes, both of which were rigidly connected to the airframe. With such an arrangement all rotor blade vibrations were reacted by the airframe and there was no problem of vibration feedback into the flight control system. This arrangement has worked well, but recent emphasis has been placed on the use of a resiliently mounted gear box which greatly reduces vibrations and noise within the aircraft. Since the output portion of the pilot's flight control system is mounted directly on the gear box, or on the main rotor servos which are mounted on the gear box, the effect of this mounting modification is that vibrations of the resiliently mounted gear box are transmitted to the input portion of the control system, resulting in undesirable control signals to the rotor head, unless some suitable means is provided for isolating them. By including a novel torsional drive coupling mechanism in the control system, the output member of which is gear box mounted and the input member of which is airframe mounted, it is possible to eliminate feedback of vibrations from the resiliently mounted gear box to the pilot's controls.

Anti-feedback torsional drive couplings have been used in various other environments and for other purposes. U.S. Pat. No. 3,242,694 to R. Schmidt, issued Mar. 29, 1966, shows such a coupling used in an automobile between the transmission and the rear end which permits a generally horizontal propeller shaft while allowing for transmission vibrations and for vertical movements of the rear axle housing, thus permitting the propeller shaft to be rigidly mounted in bearings and eliminating the tunnel in the car floor.

U.S. Pat. No. 3,563,499 to James E. Dueweke, issued Feb. 16, 1971 shows another device for reducing the feedback from a resiliently mounted gear box to the pilot's control stick. This device does not, however, utilize a torque coupling and is limited in application by requiring a long push-pull rod between bellcranks.

SUMMARY OF THE INVENTION

It is an object of this invention to provide an improved, rigid, load-carrying flight control system in a helicopter between the pilot compartment and the flight control mechanism of the main rotor head including an input portion actuated by the pilot and carried rigidly by the airframe of the helicopter and an output portion mounted on a gear box which is resiliently supported on the airframe.

It is another object of this invention to provide an improved torsional drive coupling in such a flight control system between a rigidly mounted input portion and the gear box mounted output portion.

Still another object of this invention is the provision of an improved control system as above outlined in which the servos for the main rotor flight controls are carried rigidly on the resiliently mounted gear box in position to be operated by the output portion of the control system and means is included in the control system between the input and output members which will react flight loads in the event the servos malfunction.

It is a further object of this invention to provide an acceptable flight control system between the pilot and a gear box carried main rotor servo in which the gear box can be resiliently mounted.

A yet further object of this invention is to reduce the noise and vibration in the helicopter cabin by resiliently mounting the main rotor gear box on the airframe while still providing an acceptable flight control system for the main rotor.

Still another object of this invention is generally to improve the passenger comfort and the performance of helicopters.

DESCRIPTION OF THE PREFERRED EMBODIMENTS

Figure 1:
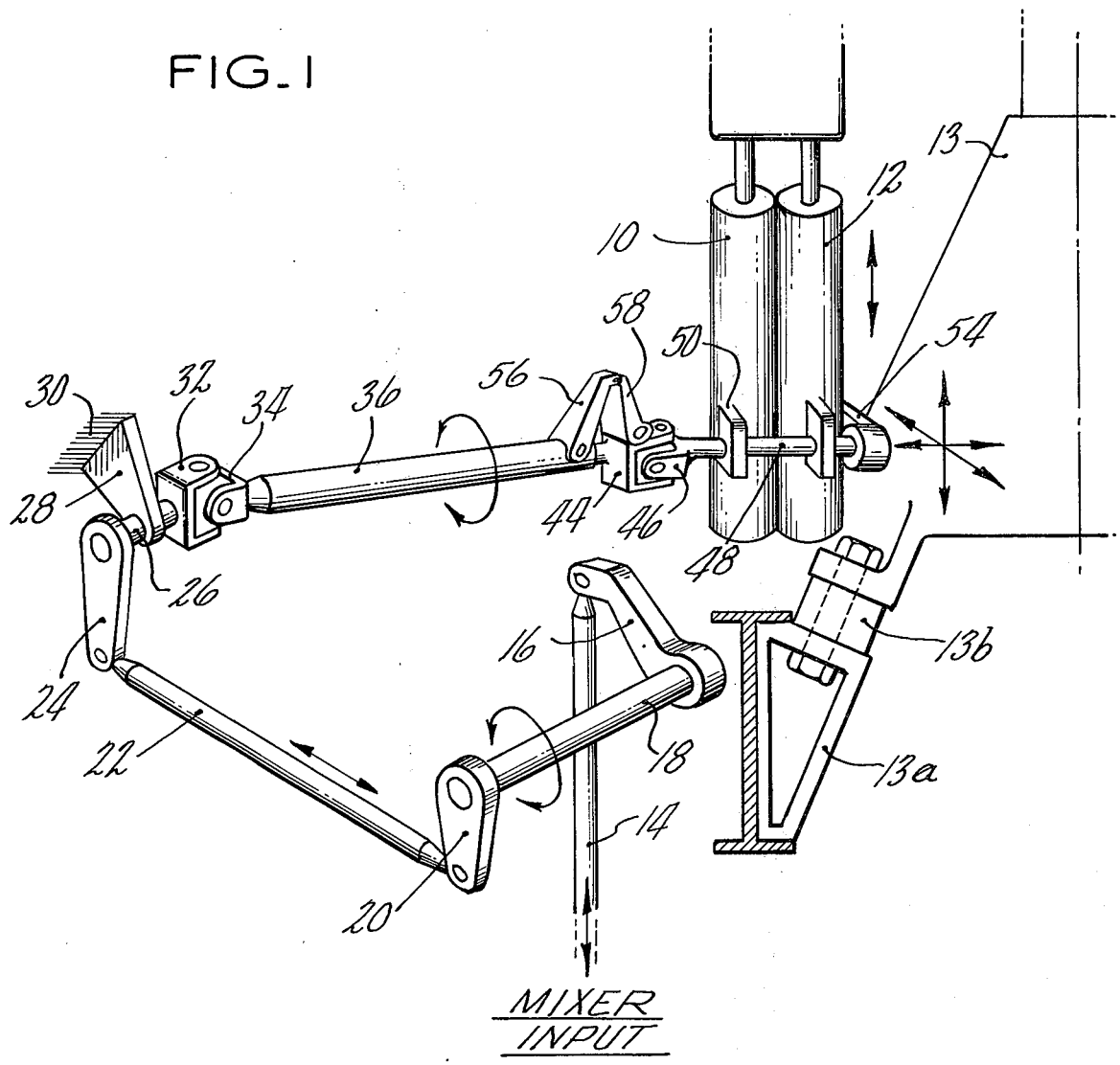
FIG. 1 shows the main rotor flight control system of a helicopter in the vicinity of a resiliently mounted gear box including the improved torque coupling of this invention.

Referring first to FIGS. 1 and 2, 10 and 12 are main rotor servos mounted on gear box 13 supported on a helicopter framework 13a by resilient mounts one of which is shown at 13b, so it is free to vibrate in all planes, as indicated by the arrows in FIG. 1. A rigid, load-carrying flight control system is provided which originates in the pilot's compartment and extends to the mixer unit and thence to the servos 10 and 12. The portion of the system from the pilot's stick to the mixer unit has not been shown since it is a conventional rod and bellcrank linkage. From the mixer unit a push-pull rod 14 is pivotally connected to an arm 16 on a shaft 18 which carries an arm 20. A push-pull rod 22 is pivotally connected at one of its ends to arm 20 and at its other end is pivotally connected to an arm 24 on a short shaft 26 journaled in a bracket 28 rigidly supported on a fuselage frame member 30. Shaft 26 carries one half 32 of a universal joint the other half 34 of which is carried by a tubular torque shaft 36. Shafts 26 and 36 and the universal joint 32,34 form the input member of a torque coupling with which this invention is particularly concerned.

The output member of the torque coupling consists of a shaft 38 (FIG. 2) which extends within shaft 36 and is axially slidable on Nylon bearings 40,42. Shaft 38 carries one half 44 of a universl joint, the other half 46 of which is carried by a shaft 48 journaled in two spaced brackets 50 on servos 10, 12 respectively. Shaft 48 carries an arm 54 which is connected to the pilot valve (not shown) of the servos. Scissors 56,58 having a common pivot 59 are pivoted at 60,62 on shaft 36 and part 44 respectively and provide the torque connection between shafts 36,48.

Figure 2:
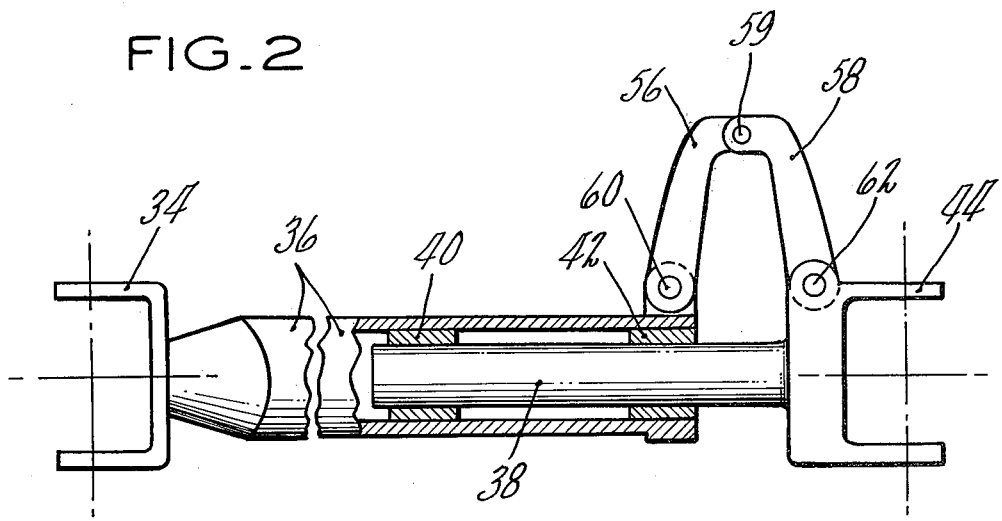
FIG. 2 is an enlarged detail, partly in section, of the torque coupling.

In the operation of the torque coupling of FIGS. 1 and 2 vertical in-plane vibrations and out-of-plane vibrations of the gear box and the servos carried thereby will be intercepted by universal joints 32,34 and 44,46. Horizontal in-plane vibrations will be intercepted by the slip joint 36,38. Thus vibrations of the gear box due to flight forces on the blades will not be transmitted beyond the torque coupling to the input portion of the flight control system.

Figure 3:
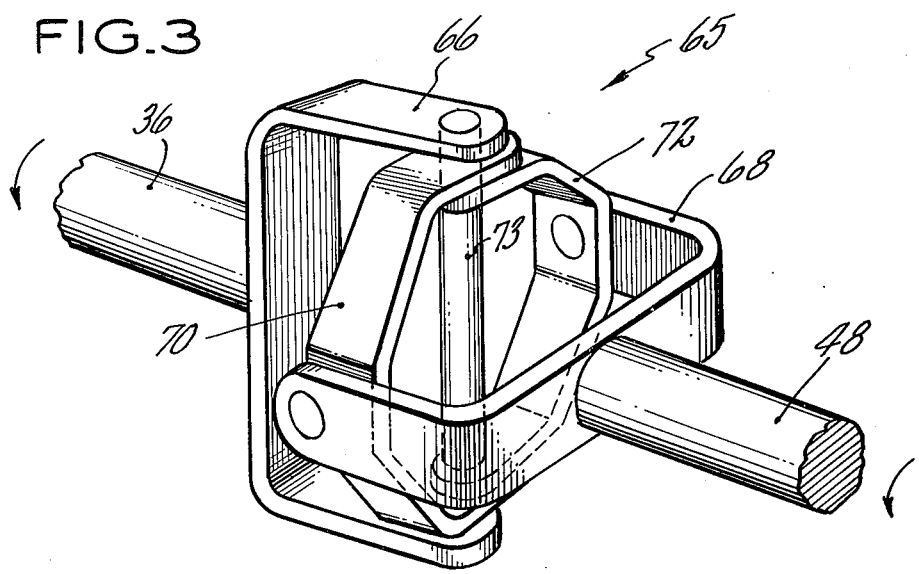
FIG. 3 is a perspective view of a modified form of torque coupling.
Figure 4:
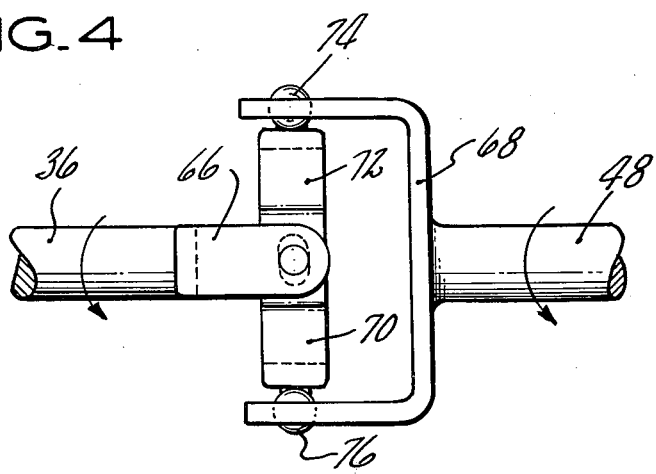
FIG. 4 is a plan view of the coupling of FIG. 3 on a reduced scale.
Figure 5:
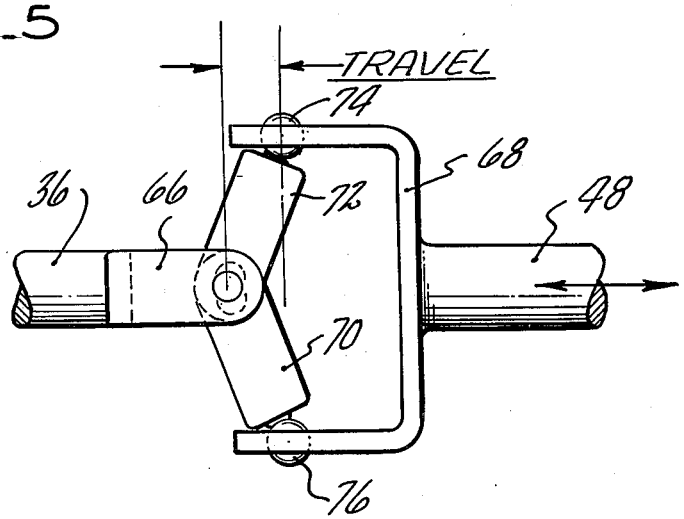
FIG. 5 is a view of the coupling of FIG. 4 in which the output member of the coupling has been moved axially to the right by the vibrating gear box.

In FIGS. 3, 4 and 5 a modified torque coupling has been shown which eliminates the slip joint of FIGS. 1 and 2. In this embodiment the universal-slip-joint member of the torque coupling shown in FIG. 2 has been replaced by a special universal joint generally indicated in FIG. 3 by 65 which connects shafts 36 and 48. To this end, shaft 36 has one half of a universal joint 66 and shaft 48 has the other and cooperating half 68. Instead of the usual rectangular block which forms the connecting member of the coupling, two confronting U-shaped links 70,72 are provided, the corresponding ends of which are overlapped and are pivotally connected by a pin 73 which also extends through the bifurcations of member 66. The U-shaped members have flat bottoms which carry external ball-end pins 74,76 which are received in sockets in the bifurcations of member 68 (FIG. 4). As a result of these connections the U-shaped members form links which can swing about their ball joints into the non-aligned FIG. 5 positions thus intercepting vibrations of the gear box which result in axial movements of shaft 48. Of course, the movement of the links can be in the opposite direction from that illustrated in FIG. 5.

In moving from the FIG. 4 position to the FIG. 5 position a very slight inward movement of the ball-end pins 74, 76 must be accommodated. This can be provided for by a slight flexibility of the bifurcations of member 68 or alternatively by slightly elongating the sockets in these members. Herein, still another way has been shown for accommodating this slight inward movement of links 70,72. As shown in FIG. 5, somewhat exaggerated for purposes of illustration, slots 78 may be provided in the overlapping ends of these links. In any case the rigid load-carrying characteristic of the universal joint will not be impaired.

While we have shown two embodiments only of our invention, we do not wish to be limited to the exact details shown herein, as many variations will occur to persons skilled in this art.

We claim:

1. In a helicopter, a rigid framework, a main rotor gear box, resilient mounts for supporting said gear box on said framework with freedom for vibratory movement in all planes, main rotor servos rigidly mounted on said gear box including a torsional servo-operating shaft, a pilot operative torsional shaft rigidly mounted on said framework which is operatively connected to manual controls in the pilot's compartment, and means for maintaining the pilot's controls free from movement due to vibrations of said gear box due to flight forces on the rotor blades including a rigid load-carrying torsion coupling connecting said servo-operating shaft and said pilot operative shaft, said coupling including an intermediate tubular torsional shaft, a first universal joint connecting said pilot operative torsional shaft and said intermediate torsional shaft, a second universal joint having one of its halves connected to said servo-operating shaft and its other half connected to a shaft which telescopes within said intermediate torsional shaft, nylon bearings between the telescoping surfaces of said telescoping shafts, and scissor mechanism torsionally connecting said intermediate torsional shaft and said other half of said second universal joint, said scissors mechanism comprising the sole torsional connection between said telescoping shafts.

2. In a helicopter, a rigid framework, a main rotor gear box, resilient mounts for supporting said gear box on said framework with freedom for vibratory movement in all planes, main rotor servos rigidly mounted on said gear box including a torsional servo-operating shaft, a pilot operative torsional shaft rigidly mounted on said framework which is operatively connected to manual controls in the pilot's compartment, and means for maintaining the pilot's controls free from movement due to vibrations of said gear box due to flight forces on the rotor blades including a rigid load-carrying torsion coupling connecting said servo-operating shaft and said pilot operative shaft, said coupling including an intermediate tubular torsional shaft, a first universal joint connecting said pilot operative torsional shaft and said intermediate torsional shaft, a second universal joint having one of its halves connected to said servo-operating shaft and its other half connected to a shaft which telescopes within said intermediate torsional shaft and scissor mechanism torsionally connecting said intermediate torsional shaft and said other half of said second universal joint, said scissors mechanism comprising the sole torsional connection between said telescoping shafts.

* * * * *